United States Patent
Wang et al.

(10) Patent No.: US 9,423,887 B2
(45) Date of Patent: Aug. 23, 2016

(54) METHOD OF ADJUSTING SAMPLING PRECISION OF A NAVIGATION DEVICE, RELATED NAVIGATION DEVICE AND RELATED TERMINAL DEVICE

(71) Applicant: PixArt Imaging Inc., Hsin-Chu (TW)

(72) Inventors: Yen-Chang Wang, Hsin-Chu (TW); Chun-Wei Chen, Hsin-Chu (TW); Yen-Min Chang, Hsin-Chu (TW)

(73) Assignee: PixArt Imaging Inc., Hsin-Chu (TW)

( * ) Notice: Subject to any disclaimer, the term of this patent is extended or adjusted under 35 U.S.C. 154(b) by 190 days.

(21) Appl. No.: 14/172,912

(22) Filed: Feb. 5, 2014

(65) Prior Publication Data

US 2015/0097779 A1  Apr. 9, 2015

(30) Foreign Application Priority Data

Oct. 8, 2013  (TW) .............................. 102136370 A (51) Int. Cl.
G06F 3/00 (2006.01)
G06F 3/0354 (2013.01)
G06F 3/038 (2013.01)

(52) U.S. Cl.
CPC ............ *G06F 3/03543* (2013.01); *G06F 3/038* (2013.01)

(58) Field of Classification Search
CPC .......... G09G 5/08; G06K 9/36; G06F 3/0354; G06F 3/03543
See application file for complete search history.

(56) References Cited

U.S. PATENT DOCUMENTS

| | | | |
|---|---|---|---|
| 2005/0094897 A1* | 5/2005 | Zuniga ................. | G06K 9/3208 382/290 |
| 2007/0002021 A1* | 1/2007 | Lin ....................... | G06F 3/0317 345/166 |

* cited by examiner

*Primary Examiner* — Michael Faragalla
(74) *Attorney, Agent, or Firm* — Winston Hsu; Scott Margo (57) ABSTRACT

A method of adjusting sampling precision of a navigation device is disclosed in the present invention. The sampling precision represents counts per inch (CPI) or dots per inch (DPI) of the navigation device. The method includes determining a predetermined mode of the navigation device, obtaining resolution of a display, and adjusting the sampling precision according to the resolution and the predetermined mode, so that the sampling precision of the navigation device can be accordingly increased and decreased due to variation of the resolution.

28 Claims, 6 Drawing Sheets

METHOD OF ADJUSTING SAMPLING PRECISION OF A NAVIGATION DEVICE, RELATED NAVIGATION DEVICE AND RELATED TERMINAL DEVICE

BACKGROUND OF THE INVENTION

1. Field of the Invention

The present invention relates to a method of adjusting sampling precision of a navigation device, and more particularly, to a navigation device and a terminal device with a related method of automatically adjusting the sampling precision.

2. Description of the Prior Art

The optical mouse utilizes an optical detecting unit to obtain coordinate information and movement information of the optical mouse. The sampling frequency of the optical mouse is set according to usage habit. For example, the sampling frequency of the optical detecting unit is increased, sensitivity of the optical mouse is greater; the sampling frequency of the optical detecting unit is decreased, the sensitivity of the optical mouse is slower. Generally, the sampling frequency (sampling precision) of the optical mouse has multiple adjustment function for customization. The sampling frequency of the optical mouse can be frequently switched to match with the application program of the computer, and user's operation is interrupted by manual switch. Thus, design of an optical mouse capable of intelligently and automatically adjusting the sampling frequency according to the usage habit is an important issue in the related consumer electronic product industry.

SUMMARY OF THE INVENTION

The present invention provides a navigation device and a terminal device with a related method of automatically adjusting the sampling precision for solving above drawbacks.

According to the claimed invention, a method of adjusting sampling precision of a navigation device is disclosed. The sampling precision represents counts per inch (CPI) or dots per inch (DPI) of the navigation device. The method includes determining a predetermined mode of the navigation device, obtaining resolution of a display, and adjusting the sampling precision according to the resolution and the predetermined mode, so that the sampling precision is accordingly increased and decreased by variation of the resolution.

According to the claimed invention, the navigation device and the display are electrically connected to a terminal device, and the terminal device varies the resolution according to an application program. The method of adjusting the sampling precision according to the resolution and the predetermined mode further includes comparing the obtained resolution with at least one threshold, adjusting the sampling precision according to a comparison, and driving the navigation device to execute coordinate detection by the adjusted sampling precision.

According to the claimed invention, the method of adjusting the sampling precision according to the comparison includes increasing the sampling precision of the navigation device when the resolution is greater than the threshold, and decreasing the sampling precision of the navigation device when the resolution is smaller than the threshold. The predetermined mode includes a plurality of thresholds, the sampling precision is adjusted according to the comparison of the resolution with the plurality of thresholds.

According to the claimed invention, the method of adjusting the sampling precision according to the resolution and the predetermined mode further includes obtaining a reference wherein the reference is a ratio of the resolution to the sampling precision, calculating the sampling precision according to the reference and the resolution, and driving the navigation device to execute coordinate detection by the sampling precision.

According to the claimed invention, the method further includes storing record of the predetermined mode, obtaining record of the predetermined mode from an external electronic device, and setting the predetermined mode of the navigation device according to the record.

According to the claimed invention, a navigation device capable of adjusting sampling precision includes a detecting unit, a transmission unit and a control unit. The detecting unit obtains coordinates of the navigation device by an optical measurement, wherein the sampling precision represents counts per inch (CPI) or dots per inch (DPI) of the detecting unit. The transmission unit outputs the coordinates in wire transmission and/or wireless transmission. The control unit is electrically connected to the detecting unit and the transmission unit. The control unit obtains resolution of a display via a terminal device, and adjusts the sampling precision according to the resolution and a predetermined mode, so that the sampling precision is accordingly increased and decreased by variation of the resolution.

According to the claimed invention, a terminal device capable of adjusting sampling precision of a navigation device is disclosed. The sampling precision represents counts per inch (CPI) or dots per inch (DPI) of the navigation device. The terminal device includes a memory module and a central processing unit. The memory module stores an execution program, wherein the execution program adjusts the sampling precision according to resolution of a display and a predetermined mode of the navigation device. The central processing unit is electrically connected to the memory module. The central processing unit obtains the resolution to adjust the navigation device via the execution program, so that the sampling precision is accordingly increased and decreased by variation of the resolution.

The method of adjusting the sampling precision of the navigation device, the related navigation device and the related terminal device of the present invention can effectively utilize the self-fitting sampling precision adjustment function to adjust the sensitivity of the navigation device, to provide comfortable operation of the navigation device and to enhance operational convenience and market competition of the computer system.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
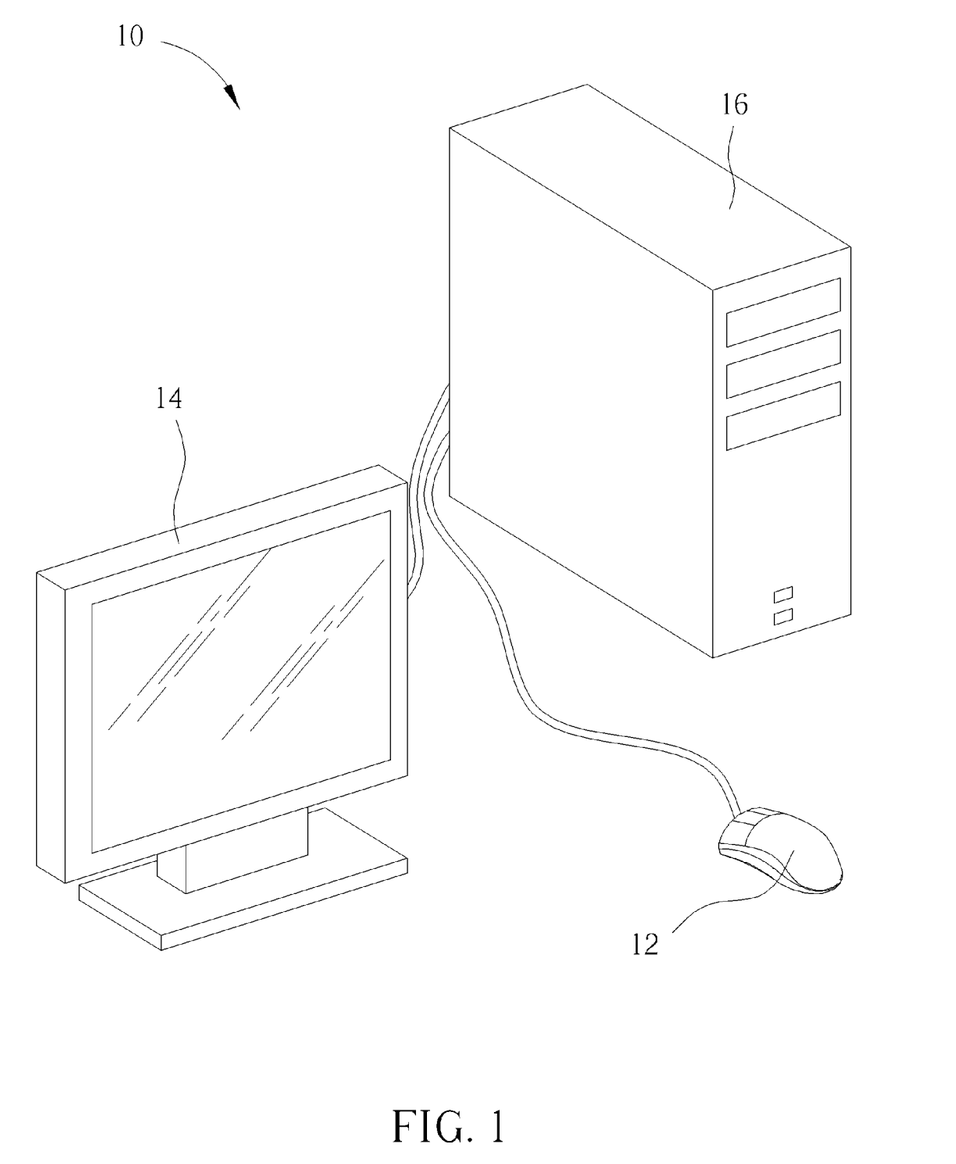
FIG. 1 is a diagram of a computer system according to an embodiment of the present invention.

Please refer to FIG. 1. FIG. 1 is a diagram of a computer system 10 according to an embodiment of the present invention. The computer system 10 includes a navigation device 12, a display 14 and a terminal device 16. The navigation device 12 and the display 14 are electrically connected to the terminal device 16. Generally, the navigation device 12 can be an optical mouse with sampling precision adjustment function. The terminal device 16 can be the computer host. The sampling precision represents counts per inch (CPI) or dots per inch (DPI) of the navigation device 12. The terminal device 16 is adapted to execute an application program, and resolution of the display 14 can be adjusted according to property of the application program. The sampling precision of the navigation device 12 can be accordingly adjusted by variation of the resolution to provide comfortable operation.

In the preferred embodiment of the present invention, the resolution of the display 14 can be increased to show exquisite images when the terminal device 15 executes game program, and the sampling precision of the navigation device 12 can be automatically adjusted to enhance sensitivity for preferable hand feeling. The resolution of the display 14 is decreased to show clear images when the terminal device 16 executes document software, and the sampling precision of the navigation device 12 can be automatically adjusted to mute the sensitivity for convenient control. Further, a ratio of the resolution of the display 14 to the sampling precision of the navigation device can be set as a constant value, so that the navigation device 12 provides the similar hand feeling no matter what resolution of the display 14 is matched. The computer 10 can selectively utilize the navigation device 12 or the terminal device 16 to execute the sampling precision auto-adjustment function of the present invention.

Figure 2:
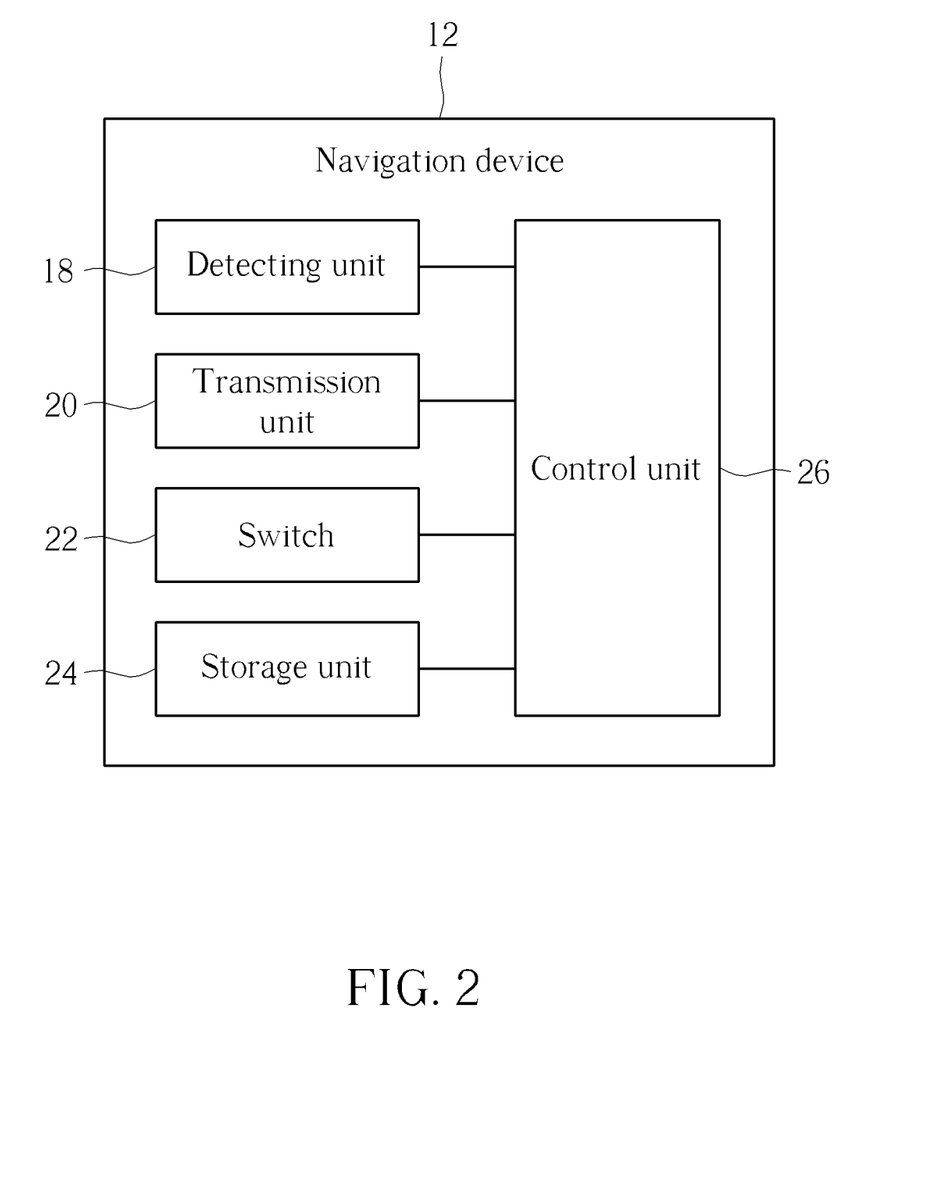
FIG. 2 is a functional block diagram of a navigation device according to a first embodiment of the present invention.

Please refer to FIG. 2. FIG. 2 is a functional block diagram of the navigation device 12 according to a first embodiment of the present invention. The navigation device 12 includes a detecting unit 18, a transmission unit 20, a switch 22, a storage unit 24 and a control unit 26. The control unit 26 is electrically connected the detecting unit 18, the transmission unit 20, the switch 22 and the storage unit 24. The detecting unit 18 utilizes an optical measurement technology to sample when the navigation device 12 moves, so as to acquire coordinates of the navigation device 12 at different positions. The transmission unit 20 can be a universal serial bus module, a near field communication module, a Bluetooth communication module, an infrared communication module or a network communication module. The transmission unit 20 outputs the coordinates detected by the detecting unit 18 in wire transmission and/or wireless transmission.

The navigation device 12 includes a plurality of predetermined modes, such as the first predetermined mode, the second predetermined mode and the third predetermined mode, which is selected according to user's demand. As the navigation device 12 is switched to the first predetermined mode, the sampling precision is constant, and the sensitivity of the navigation device 12 is not adjusted by variation of the resolution. As the navigation device 12 is switched to the second predetermined mode, the sampling precision can be adjusted due to the variation of the resolution generated by the application program of the terminal device 16, and the sensitivity of the navigation device 12 is increased and decreased according to usage environment (the application program executed by the terminal device 16). As the navigation device 12 is switched to the third predetermined mode, the specific ratio of the sampling precision to the resolution is set, and the sampling precision is accordingly adjusted by operation of the display 14 to keep habitually practice. The navigation device 12 utilizes the switch 22, which can be software, hardware or firmware, to switch operation modes (the predetermined mode) of the navigation device 12.

The storage unit 24 can be a built-in memory component of the navigation device 12 to store record of the above-mentioned predetermined mode. When the predetermined mode of the navigation device 12 is set, the control unit 26 stores the record into the storage unit 24, and the record can be read to reset at next actuation of the navigation device 12. The navigation device 12 further can utilize the transmission unit 20 to transmit the record from the storage unit 24 to an external electronic device, such as the portable cell phone, the cloud server or the mouse with the same function. The record can be utilized to set the other navigation device. The storage unit 24 further can be the memory component disposed on the external electronic device. The navigation 12 utilizes the transmission unit 20 to obtain the record of the predetermined mode from the external electronic device, and sets the operation mode (the predetermined mode) of the navigation device 12 according to the record.

When the navigation device 12 is switched to the second predetermined mode or the third predetermined mode, the control unit 26 utilizes the transmission unit 20 to obtain the resolution of the display 14 via the terminal device 16, and then determines the predetermined mode of the navigation device 12. The predetermined mode can be set by the switch 22 or further be set by the record of the external electronic device via the transmission unit 20. The control unit 26 analyzes and calculates the sampling precision based on the selected predetermined mode and the obtained resolution, and the detecting unit 18 is adjusted accordingly. The sampling precision of the navigation device 12 can be increased and decreased according to the application program of the terminal device 16 or the resolution of the display 14. The method of adjusting the sampling precision is introduced as following.

Figure 3:
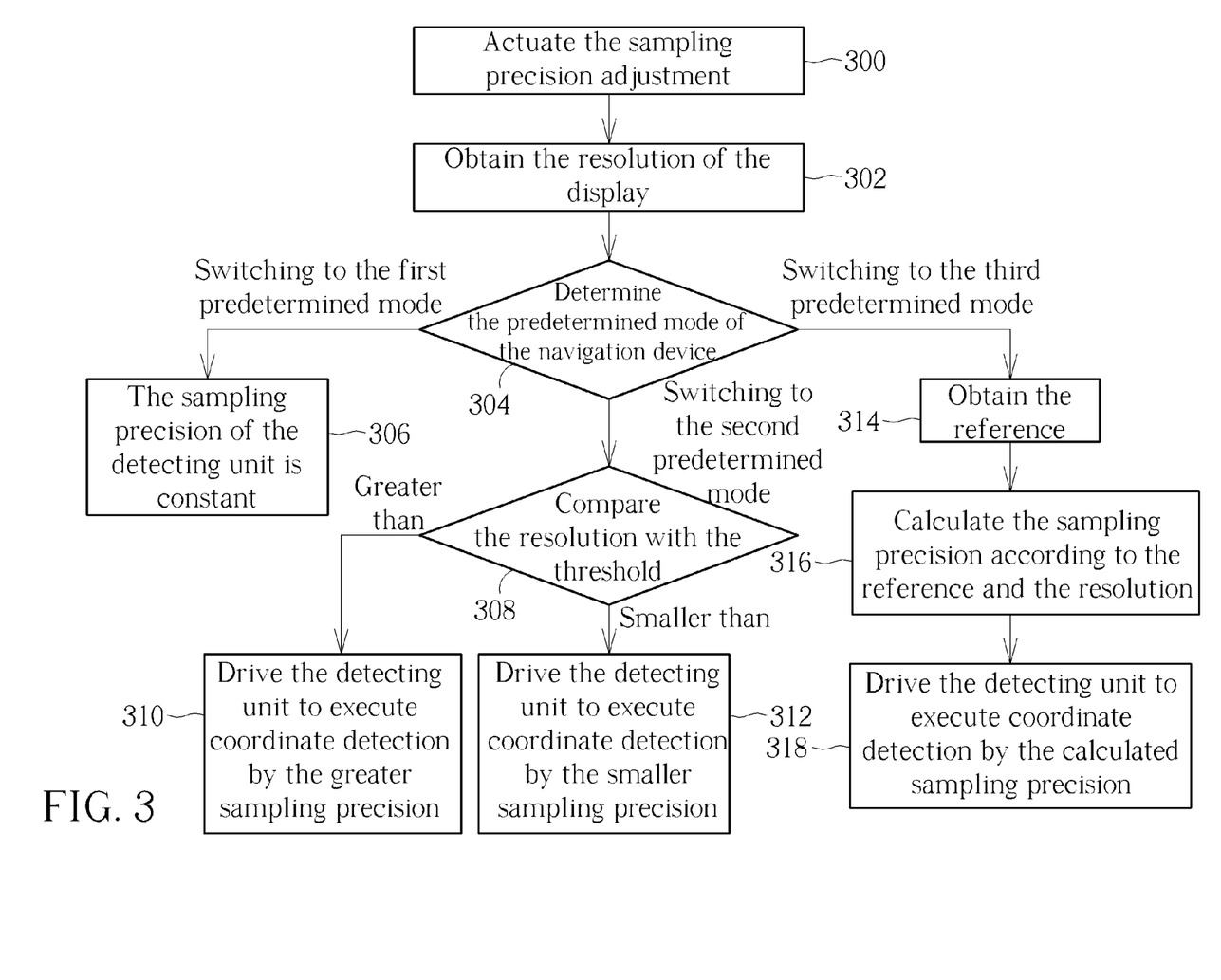
FIG. 3 is a flow chart of adjusting the sampling precision of the navigation device according to a first embodiment of the present invention.

Please refer to FIG. 3. FIG. 3 is a flow chart of adjusting the sampling precision of the navigation device 12 according to a first embodiment of the present invention. Method illustrated in FIG. 3 is suitable for the navigation device 12 and the computer system 10 shown in FIG. 1 and FIG. 2. First, step 300 and step 302 are executed to actuate the sampling precision adjustment function, and the control unit 26 connects to the terminal device 16 to obtain the resolution of the display 14. The predetermined mode of the navigation device 12 can be selected from the plurality of predetermined modes by the switch 22. Then, step 304 is executed that the control 26 determines the predetermined mode of the navigation device 12. The navigation device 12 of this embodiment has the first predetermined mode with the constant sampling precision, the second predetermined mode that the sampling precision is intelligently adjusted according to the application program of the terminal device 16, and the third predetermined mode that the sampling precision is automatically adjusted according to the specific ratio of the resolution to the sampling precision. Application of the predetermined modes is not limited to the above-mentioned embodiment, and depends on actual demand. When the navigation device 12 is switched to the first predetermined mode, step 306 is executed to fix the sampling precision of the detecting unit 18, and meantime the sensitivity of the navigation device 12 is not adjusted by parameter variation of the computer system 10.

Figure 4:
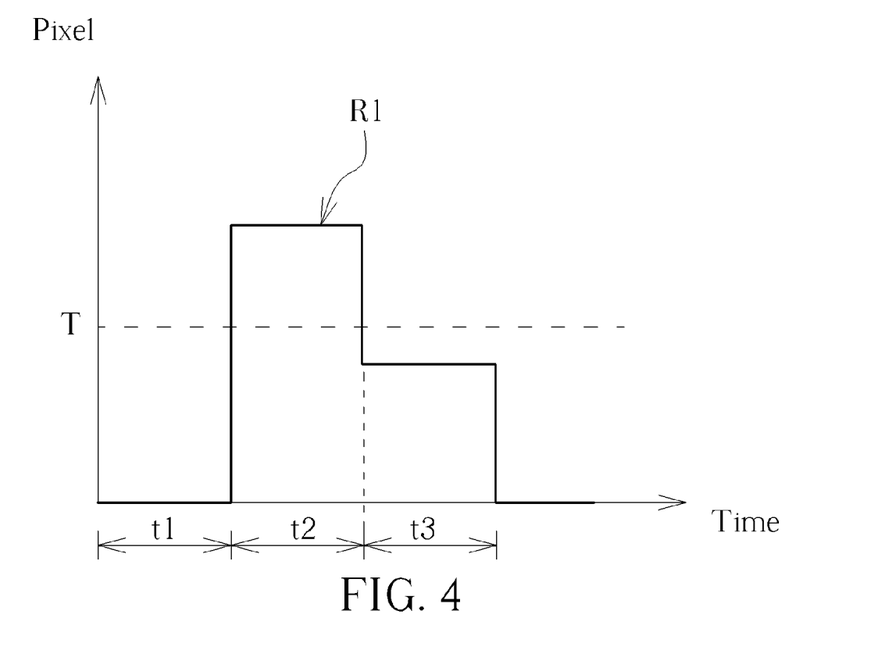
FIG. 4 is a diagram of an adjustable resolution of a display according to the first embodiment of the present invention.

When the navigation device 12 is switched to the second predetermined mode, step 308 is executed to compare the obtained resolution R1 with at least one threshold T by the control unit 26, so as to determine quality demand of the computer system 10 and sampling sensitivity of the navigation device 12 according to the comparison. The detecting unit 18 at least includes a first sampling precision and a second sampling precision, and the first sampling precision is greater than the second sampling precision. Please refer to FIG. 4. FIG. 4 is a diagram of the adjustable resolution R1 of the display 14 according to the first embodiment of the present invention. In the first operation period t1, the display 14 may be closed or the terminal device 16 switches the application programs. The control unit 26 does not read the resolution R1 of the display 14 and the sampling precision of the detecting unit 18 is constant. In the second operation period t2, the resolution R1 is greater than the threshold T, the application program executed by the terminal device 16 has high quality demand, such as the game program or video program, and the sampling precision of the navigation device 12 is accordingly increased to provide sensitive hand feeling. Thus, step 310 is executed that the control unit 26 drives the detecting unit 18 to execute coordinate detection by the first sampling precision. In the third operation period t3, the resolution R1 is smaller than the threshold T, the application program of the terminal device 16 has normal quality demand, such as the document software or web browser program, so the sampling precision of the navigation device 12 can be accordingly decreased to conveniently control the operational page. Step 312 is executed that the control unit 26 drives the detecting unit 18 to execute the coordinate detection by the second sampling precision.

Figure 5:
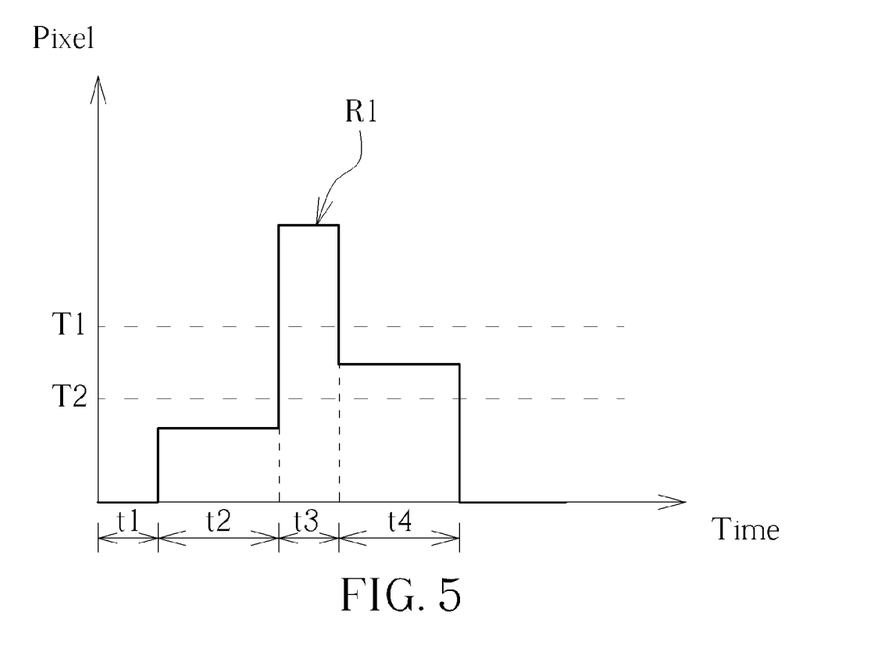
FIG. 5 is a diagram of the adjustable resolution of the display in the other mode according to the first embodiment of the present invention.

The second predetermined mode can include a plurality of thresholds, such as a first threshold T1 and a second threshold T2, and the first threshold T1 is greater than the second threshold T2. The detecting unit 18 can have the first sampling precision, the second sampling precision and the third sampling precision, and the second sampling precision is between the first sampling precision and the third sampling precision. Please refer to FIG. 5. FIG. 5 is a diagram of the adjustable resolution R1 of the display 14 in the other mode according to the first embodiment of the present invention. In the first operation period t1, the control unit 26 does not read the resolution R1 of the display 14, and the sampling precision of the detecting unit 18 is constant. In the second operation period t2, the resolution R1 is smaller than the second threshold T2, the control unit 26 drives the detecting unit 18 to execute the coordinate detection by the third sampling precision. In the third operation period t3, the resolution R1 is greater than the second threshold T2, the control unit 26 drives the detecting unit 18 to execute the coordinate detection by the first sampling precision. In the fourth operation period t4, the resolution R1 is between the first threshold T1 and the second threshold T2, the control unit 26 drives the detecting unit 18 to execute the coordinate detection by the second sampling precision. It is to say, the sampling precision of the navigation device 12 can be multiply adjusted according to an amount of the thresholds.

When the navigation device 12 is switched to the third predetermined mode, step 314 is executed that the control unit 26 obtains the reference R2 from the storage unit 24. The reference R2 can be a ratio of the resolution R1 to the sampling precision. Step 316 is executed that the control unit 26 calculates the sampling precision according to the reference R2 and the resolution R1. Final, step 318 is executed that the control unit 26 drives the detecting unit 18 to execute the coordinate detection by the calculated sampling precision. As the detecting unit 18 has the plurality of options (the predetermined sampling precisions) and the option does not conform to the calculated sampling precision, the control unit 26 selectively utilizes the approximate sampling precision to drive the detecting unit 18. The approximate sampling precision represents a value mostly approximate to the calculated sampling precision. For example, the detecting unit 18 has the predetermined sampling precisions of 2200 CPI, 1600 CPI and 1200 CPI. The reference R2 is 0.85. As the resolution R1 is 1920*1080 pixels, the control unit 26 drives the detecting unit 18 by the sampling precision of 2200 CPI based on ratio calculation (1920/2200=0.87). As the resolution R1 is 1024*768 pixels, the control unit 26 drives the detecting unit 18 by the sampling precision of 1200 CPI based on ratio calculation (1024/1200=0.85). The navigation device 12 provides the similar hand feeling no matter what resolution of the display 14 is adjusted.

Figure 6:
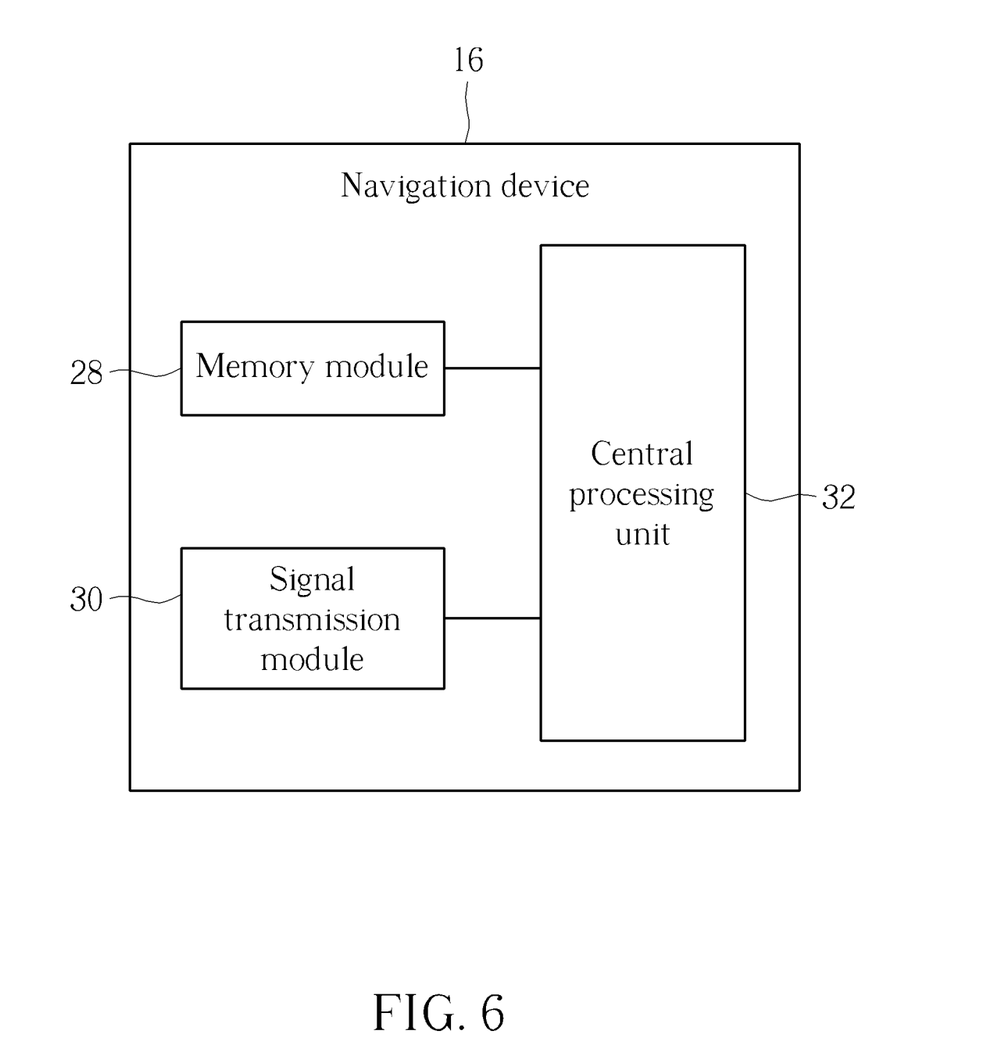
FIG. 6 is a functional block diagram of a terminal device according to a second embodiment of the present invention.

Please refer to FIG. 6. FIG. 6 is a functional block diagram of the terminal device 16 according to a second embodiment of the present invention. The terminal device 16 includes a memory module 28, a signal transmission module 30 and a central processing unit 32. The memory module 28 is adapted to store the specific execution program, which may be software and has functions of switching the plurality of predetermined modes of the navigation device 12 and adjusting the sampling precision of the navigation device 12 according to the predetermined mode of the navigation device 12 and the resolution of the display 14. The central processing unit 32 is electrically connected to the memory module 28 and the signal transmission module 30 to execute the application programs (such as the game program and the document software) and to show operation result on the display 14. In the second embodiment, the central processing unit 32 can vary the resolution of the display 14 according to the executed application program or usage setting. The central processing unit 32 can generate a control command via the execution program after the resolution is obtained. The control command is transmitted to the navigation device 12 via the signal transmission module 30, and the sampling precision of the navigation device 12 can be accordingly increased and decreased by the variation of the resolution.

Figure 7:
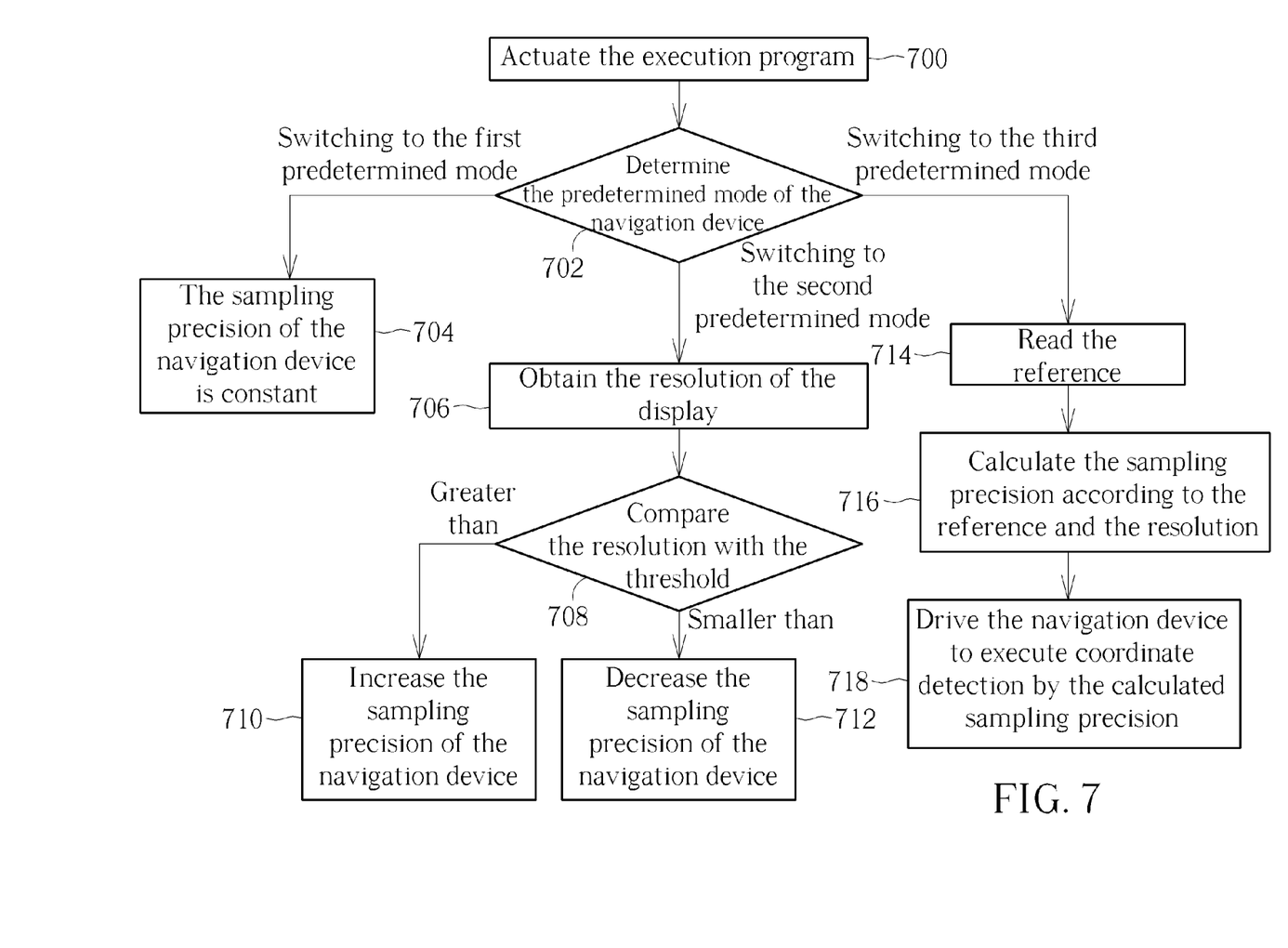
FIG. 7 is a flow chart of adjusting the sampling precision of the navigation device according to the second embodiment of the present invention.

Please refer to FIG. 7. FIG. 7 is a flow chart of adjusting the sampling precision of the navigation device 12 according to the second embodiment of the present invention. Method illustrated in FIG. 7 is suitable for the navigation device 12 and the computer system 10 shown in FIG. 1 and FIG. 6. The navigation device 12 of the second embodiment has the first predetermined mode, the second predetermined mode and the third predetermined mode. Content of each predetermined mode is the same as ones of the above-mentioned embodiment, and the detailed description is omitted herein for simplicity. First, step 700 and step 702 are executed, and the central processing unit 32 actuates the execution program to determine the predetermined mode of the navigation device 12. As the navigation device 12 is the first predetermined mode, step 704 is executed that the sampling precision of the navigation device 12 is constant. As the navigation device 12 is the second predetermined mode, step 706 is executed that the central processing unit 32 obtains the resolution of the display 14. The resolution is varied according to the application program of the central processing unit 32 or the usage setting, and step 708 is executed that the central processing unit 32 compares the present resolution with the threshold to adjust the navigation device 12 according to the comparison.

The central processing unit 32 can switch the display 14 to the first resolution or the second resolution according to different application programs, and the first resolution (which is applied to the game program) is greater than the second resolution (which is applied to the document software). When the central processing unit 32 drives the display 14 by the first resolution and the first resolution is greater than the threshold, step 710 is executed that the central processing unit 32 increases the sampling precision (such as the first sampling precision of the first embodiment) of the navigation device 12 via the signal transmission module 30. When the central processing unit 32 switches the display 14 to the second resolution and the second resolution is smaller then the threshold, step 712 is executed that the central processing unit 32 decreases the sampling precision of the navigation device 12 via the signal transmission module 30. For example, the navigation device 12 can execute the coordinate detection by the second sampling precision as mentioned above.

When the navigation device 12 is switched to the third predetermined mode, step 714 is executed that the central processing unit 32 reads the reference from the memory module 28. The reference of the second embodiment is the ratio of the resolution to the sampling precision. Step 716 and step 718 are executed, the central processing unit 32 calculates the sampling precision according to the reference and the obtained resolution, and the signal transmission module 30 is utilized to transmit the calculated result to the navigation device 12. The navigation device 12 is adapted to execute the coordinate detection by the adjusted sampling precision. Therefore, the computer system 10 can utilize the built-in execution program of the terminal device 16 to adjust the predetermined mode of the navigation device 12. The suitable sampling precision is calculated by the execution program to drive the navigation device 12 for the coordinate detection. It should be mentioned that the first embodiment and the second embodiment both have the same self-fitting function. The approximate sampling precision is utilized to drive the navigation device 12 when the navigation device 12 does not have the calculated sampling precision, and the approximate sampling precision has a value mostly approximate to the calculated sampling precision.

The central processing unit 32 further can store the record of the predetermined mode into the memory module 28, and the execution program can utilize the record to set the other navigation device electrically connected to the terminal device 16. The central processing unit 32 further can store the record of the predetermined mode into the built-in memory component (such as memory unit 24 of the first embodiment) of the navigation device 12, and the navigation device 12 can automatically adjust the sampling precision according to the record of the predetermined mode when electrically connecting to the other terminal device. The central processing unit 32 further can store the record of the predetermined mode into the memory component of the cloud server, the terminal device 16 and the navigation device 12 can respectively connect to the cloud server to obtain the related record for the sampling precision adjustment function.

In conclusion, the method of adjusting the sampling precision of the navigation device of the present invention provides the self-fitting sampling precision adjustment function, and the sampling precision adjustment function can be executed by the navigation device or the terminal device selectively. The navigation device with the sampling precision adjustment function can be applied to any types of the display and the terminal device. Parameters of the display and the terminal device are detected by the navigation device to automatically adjust the sampling precision for convenient operation of the navigation device. The terminal device with the sampling precision adjustment function can adjust the navigation device without the sampling precision adjustment function, which means the terminal device drives the matched navigation device to adjust the sampling precision.

The method of adjusting the sampling precision of the navigation device of the present invention provides options of the plurality of predetermined modes, which is selected according to user's demand. As the user intends to adjust the sampling precision by the application program of the terminal device, the self-fitting sampling precision adjustment function can classify the usage environment of the terminal device, the sensitivity of the navigation device are respectively increased and decreased when the terminal device is switched to the game mode and the document mode for comfortable hand feeling. As the users intends to keep the same hand feeling under different usage environments (such as the game mode and the document mode), the self-fitting sampling precision adjustment function can adjust the sensitivity of the navigation device according to the resolution of the display. The sensitivity of the navigation device is constant even through the resolution of the display is varied by the application program of the terminal device.

Comparing to the prior art, the method of adjusting the sampling precision of the navigation device, the related navigation device and the related terminal device of the present invention can effectively utilize the self-fitting sampling precision adjustment function to adjust the sensitivity of the navigation device, to provide comfortable operation of the navigation device and to enhance operational convenience and market competition of the computer system.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of adjusting sampling precision of a navigation device, the sampling precision representing counts per inch (CPI) or dots per inch (DPI) of the navigation device, the method comprising:
   determining a predetermined mode of the navigation device;
   obtaining resolution of a display; and
   adjusting the sampling precision according to the resolution and the predetermined mode, so that the sampling precision is accordingly increased and decreased by variation of the resolution.

2. The method of claim 1, wherein the navigation device comprises a plurality of predetermined modes, the method further comprises:
   selecting the predetermined mode from the plurality of predetermined modes.

3. The method of claim 1, wherein the navigation device and the display are electrically connected to a terminal device, the terminal device varies the resolution according to an application program, the method of adjusting the sampling precision according to the resolution and the predetermined mode further comprises:
   comparing the obtained resolution with at least one threshold;
   adjusting the sampling precision according to a comparison; and
   driving the navigation device to execute coordinate detection by the adjusted sampling precision.

4. The method of claim 3, wherein the method of adjusting the sampling precision according to the comparison comprises:
increasing the sampling precision of the navigation device when the resolution is greater than the threshold.

5. The method of claim 3, wherein the method of adjusting the sampling precision according to the comparison comprises:
decreasing the sampling precision of the navigation device when the resolution is smaller than the threshold.

6. The method of claim 3, wherein the predetermined mode comprises a plurality of thresholds, the sampling precision is adjusted according to the comparison of the resolution with the plurality of thresholds.

7. The method of claim 1, wherein the method of adjusting the sampling precision according to the resolution and the predetermined mode further comprises:
obtaining a reference, wherein the reference is a ratio of the resolution to the sampling precision;
calculating the sampling precision according to the reference and the resolution; and
driving the navigation device to execute coordinate detection by the sampling precision.

8. The method of claim 7, wherein the approximate sampling precision is utilized to drive the navigation device when the navigation device does not have the calculated sampling precision.

9. The method of claim 1, further comprising:
storing record of the predetermined mode.

10. The method of claim 1, further comprising:
obtaining record of the predetermined mode from an external electronic device; and
setting the predetermined mode of the navigation device according to the record.

11. A navigation device capable of adjusting sampling precision, the navigation device comprising:
a detecting unit for obtaining coordinates of the navigation device by an optical measurement, wherein the sampling precision represents counts per inch (CPI) or dots per inch (DPI) of the detecting unit;
a transmission unit for outputting the coordinates in wire transmission and/or wireless transmission; and
a control unit electrically connected to the detecting unit and the transmission unit, the control unit obtaining resolution of a display via a terminal device, and adjusting the sampling precision according to the resolution and a predetermined mode, so that the sampling precision is accordingly increased and decreased by variation of the resolution.

12. The navigation device of claim 11, wherein the control unit comprises a plurality of predetermined modes, the navigation device further comprises a switch electrically connected to the control unit, and the switch is adapted to switch the plurality of predetermined modes.

13. The navigation device of claim 12, wherein the switch is hardware, software or firmware.

14. The navigation device of claim 11, wherein the terminal device varies the resolution according to an application program, the control unit compares the obtained resolution with a threshold, and adjusts the sampling precision of the detecting unit according to a comparison.

15. The navigation device of claim 14, wherein the detecting unit comprises a first sampling precision and a second sampling precision, the first sampling precision is greater than the second sampling precision, the control unit drives the detecting unit to execute coordinate detection by the first sampling precision when the resolution is greater than the threshold, and further drives the detecting unit to execute the coordinate detection by the second sampling precision when the resolution is smaller than the threshold.

16. The navigation device of claim 11, wherein the control unit reads a reference, the reference is a ratio of the resolution to the sampling precision, the control unit calculates the sampling precision according to the reference and the obtained resolution, so as to drive the detecting unit to execute coordinate detection by the sampling precision.

17. The navigation device of claim 16, wherein the control unit utilizes the predetermined sampling precision to drive the detecting unit, the predetermined sampling precision is a value approximate to the calculated sampling precision.

18. The navigation device of claim 11, further comprising:
a storage unit for storing record of the predetermined mode.

19. The navigation device of claim 18, wherein the storage unit is a built-in memory component of the navigation device or a memory component of an external electronic device.

20. The navigation device of claim 11, wherein the control unit further utilizes the transmission unit to obtain record of the predetermined mode from an external electronic device, and sets the control unit according to the record.

21. The navigation device of claim 11, wherein the transmission unit is a universal serial bus module, a near field communication module, a Bluetooth communication module or an infrared communication module.

22. A terminal device capable of adjusting sampling precision of a navigation device, the sampling precision representing counts per inch (CPI) or dots per inch (DPI) of the navigation device, the terminal device comprising:
a memory module for storing an execution program, wherein the execution program adjusts the sampling precision according to resolution of a display and a predetermined mode of the navigation device, and
a central processing unit electrically connected to the memory module, the central processing unit obtaining the resolution to adjust the navigation device via the execution program, so that the sampling precision is accordingly increased and decreased by variation of the resolution.

23. The terminal device of claim 22, wherein the navigation device comprises a plurality of predetermined modes, the execution program is adapted to switch the plurality of predetermined modes.

24. The terminal device of claim 22, wherein the central processing unit varies the resolution according to an application program or usage setting.

25. The terminal device of claim 24, wherein the central processing unit compares the varied resolution with a threshold, and adjusts the sampling precision according to a comparison.

26. The terminal device of claim 25, wherein the central processing unit increases the sampling precision of the navigation device when the central processing unit switches the display to a first resolution according to the application program and the first resolution is greater than the threshold, the central processing unit further decreases the sampling precision of the navigation device when the central processing unit switches the display to a second resolution according to the application program and the second resolution is smaller than the threshold.

27. The terminal device of claim 22, wherein the central processing unit reads a reference, the reference is a ratio of the resolution to the sampling precision, the central processing unit calculates the sampling precision according to the reference and the obtained resolution, so as to drive the navigation device to execute coordinate detection by the sampling precision.

28. The terminal device of claim 22, wherein the central processing unit stores record of the predetermined mode into the memory module or a storage unit, the storage unit is a built-in memory component of the navigation device or a memory component of a cloud server.

\* \* \* \* \*